(12) United States Patent
Anderson

(10) Patent No.: US 6,888,625 B2
(45) Date of Patent: May 3, 2005

(54) SINGLE SWEEP MEASUREMENT OF MULTIPLE OPTICAL CHARACTERISTICS

(75) Inventor: Duwayne R. Anderson, St. Helens, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 10/417,742

(22) Filed: Apr. 16, 2003

(65) Prior Publication Data

US 2004/0207833 A1 Oct. 21, 2004

(51) Int. Cl.⁷ .............................................. G01N 21/00
(52) U.S. Cl. ................................................. 356/73.1
(58) Field of Search ..................... 356/73.1, 364–367; 250/214 R, 227.23, 227.24, 225; 359/191–193

(56) References Cited

U.S. PATENT DOCUMENTS

| | | | | |
|---|---|---|---|---|
| 5,298,972 A | * | 3/1994 | Heffner ....................... | 356/364 |
| 5,724,126 A | * | 3/1998 | Nishi et al. ................. | 356/73.1 |
| 6,504,604 B1 | * | 1/2003 | Holland ...................... | 356/73.1 |

2002/0196426 A1  12/2002  Sloite

OTHER PUBLICATIONS

Publication: Dennis Derickson, "Fiber Optic Test and Measurement", 1998, pp. 224–226, published by Prentice Hall, Inc., Upper Saddle River, New Jersey.

Derickson, Dennis, "Fiber Optic Test and Measurement," 1998, pp. 224–226, XP002293688, Hewlett–Packard Company, Prince Hall, New Jersey.

* cited by examiner

*Primary Examiner*—Tu T. Nguyen
(74) *Attorney, Agent, or Firm*—Finnegan Henderson Farabow Garrett & Dunner LLP

(57) ABSTRACT

A method of measuring multiple optical characteristics of an optical device during a single sweep of a swept wavelength optical system cyclically changes an input state of polarization on consecutive optical frequency increments of an optical signal within the wavelength range of the swept wavelength optical system. From the measured output states of polarization a wavelength-dependent Jones matrix is calculated, and from the Jones matrix the multiple optical characteristics are determined, which characteristics may include PDL and DGD.

13 Claims, 2 Drawing Sheets

SINGLE SWEEP MEASUREMENT OF MULTIPLE OPTICAL CHARACTERISTICS

BACKGROUND OF THE INVENTION

The present invention relates to the measurement of optical characteristics of an optical device under test, and more particularly to a method and apparatus for measuring multiple optical characteristics in a single sweep of a swept wavelength system using Jones Matrix Eigen Analysis.

It is well known in the art that the Jones matrix of an arbitrary two-port optical device may be measured by using three known input states of polarization and measuring the resulting output states of polarization. Polarized light is represented by a two-element complex vector, i.e., the Jones vector, the elements of which specify the magnitude and phase of the x- and y-components of the electric field at a particular point in space. The Jones matrix for the optical device relates the input and output Jones vectors to each other. The Jones matrix representation is found by measuring three output Jones vectors in response to three known input stimulus states of polarization, or input Jones vectors. *Fiber Optic Test and Measurement*, Dennis Derickson, Prentice Hall, 1998, page 225. The mathematical calculations are simplest when the stimuli are linear polarizations oriented at zero, forty-five and ninety degrees as shown in FIG. 1, but any three distinct stimuli may be used.

Using the convention shown in FIG. 1 the Jones matrix of an optical device under test (DUT) at a particular optical frequency is calculated from the following equation:

$$J = C \begin{bmatrix} K1 * K4 & K2 \\ K4 & 1 \end{bmatrix}$$

where the different components of the Jones matrix are given by:

$$K1=[X1/Y1]\ K2=[X2/Y2]\ K3=[X3/Y3]\ K4=[(K3-K2)/(K1-K3)]$$

and J[X1,Y1] is the output Jones vector for the input linear-horizontal state of polarization, J[X2, Y2] is the output Jones vector for the input linear-vertical state of polarization, and J[X3, Y3] is the output Jones vector for the input linear-forty-five degree state of polarization. In the Jones matrix equation the factor C is a constant phase/amplitude multiplier that is undetermined and unnecessary for measuring polarization-dependent loss (PDL) or polarization differential group delay (DGD). In practice the output Stokes vector is measured and then the Jones vector is calculated, as is well-known to those skilled in the optical arts as shown in the Derickson text book cited above.

Also it is well known that the wavelength-dependent Jones matrix may be measured by sweeping over a wavelength range using a fixed input horizontal state of polarization while measuring the output state of polarization at each wavelength increment; then sweeping over the same wavelength range using a different fixed input vertical state of polarization while measuring the output state of polarization at each wavelength; and sweeping a third time over the same wavelength range using yet another fixed input state of polarization while measuring the output state of polarization. Then by correctly registering the sweeps from the various output states of polarization with the same wavelengths for each sweep, the Jones matrix is calculated at each wavelength using the equations above.

Further it is well known that one may measure the three output states of polarization for three different input states of polarization at a fixed wavelength, and then calculate the Jones matrix at that wavelength. The wavelength may then be indexed and the process repeated to calculate the Jones matrix as a function of wavelength. Knowing the Jones matrix as a function of wavelength is important because it allows the determination of wavelength dependent optical characteristics such as polarization-dependent loss (PDL) and polarization dependent group delay (DGD). These are important characteristics of optical devices, and help to determine the degree to which the optical device may degrade an optical telecommunications system. Given the Jones matrix the PDL may be found from:

$$PDL=10*Log(\lambda 1/\lambda 2)$$

where $\lambda 1$ and $\lambda 2$ are the eigenvalues of $(J^*)^T J$. The DGD is also found from the Jones matrix as:

$$DGD(\omega)=\|arg(\rho 1/\rho 2)/\Delta\omega\|$$

where $\rho 1$ and $\rho 2$ are the eigenvalues of $J(\omega+\Delta\omega)*J^{-1}(\omega)$.

It is obvious from these descriptions that the testing over wavelength is slow. The first process requires three different scans over a wavelength range. If there are N wavelengths in each scan, then the first method requires the measurement of N*3 output states of polarization. The second method steps through the wavelengths only once, but this must be a stepping motion with a pause at each wavelength to measure the three different states of polarization. Again the number of output states of polarization is N*3.

What is desired is a faster method of measuring multiple optical characteristics of an optical device that requires fewer measurements of output states of polarization, and more specifically a method of scanning over a wavelength range once to determine the wavelength-dependent Jones matrix of the optical device from which the multiple optical characteristics are calculated simultaneously.

BRIEF SUMMARY OF THE INVENTION

Accordingly the present invention provides a single sweep measurement of multiple optical characteristics of an optical device using a swept wavelength system that cyclically changes known input states of polarization on consecutive optical frequencies as the optical frequency is incremented within the wavelength range of the swept wavelength system. From the measured output states of polarization a wavelength-dependent Jones matrix for the optical device is calculated, and from the Jones matrix the multiple optical characteristics are determined, which characteristics may include PDL and DGD.

The objects, advantages and other novel features of the present invention are apparent from the following detailed description when read in conjunction with the appended claims and attached drawing.

DETAILED DESCRIPTION OF THE INVENTION

Table 1 below shows the first nine measurements from a plurality of measurements made for an optical device under test in a single sweep of a swept optical test system over a range of wavelengths $\omega_0-\omega_n$. H stands for an input linear-horizontal state of polarization (SOP), V stands for an input linear-vertical SOP and F stands for an input linear-45-degree SOP.

| Optical Frequency ($\omega$) | Input State of Polarization | Measure Output SOP (Jones Vector) |
|---|---|---|
| $\omega_0$ | H | $J_0[X_0, Y_0]$ |
| $\omega_1$ | V | $J_1[X_1, Y_1]$ |
| $\omega_2$ | F | $J_2[X_2, Y_2]$ |
| $\omega_3$ | H | $J_3[X_3, Y_3]$ |
| $\omega_4$ | V | $J_4[X_4, Y_4]$ |
| $\omega_5$ | F | $J_5[X_5, Y_5]$ |
| $\omega_6$ | H | $J_6[X_6, Y_6]$ |
| $\omega_7$ | V | $J_7[X_7, Y_7]$ |
| $\omega_8$ | F | $J_8[X_8, Y_8]$ |

$J_i$ is the $i^{th}$ Jones vector measured at the $i^{th}$ optical frequency within the swept wavelength range $\omega_0 \ldots \omega_n$. The equations for the components of the Jones matrix at each optical frequency using a linear interpolation are:

$$K1_{k+i} = X_i/Y_i + [(\omega_{i+k}-\omega_i)/(\omega_{i+3}-\omega_i)]*[X_{i+3}/Y_{i+3}-X_i/Y_i]$$

$$K2_{k+i} = X_{i+1}/Y_{i+1} + [(\omega_{i+k}-\omega_{i+1})/(\omega_{i+4}-\omega_{i+1})]*[X_{i+4}/Y_{i+4}-X_{i+1}/Y_{i+1}]$$

$$K3_{k+i} = X_{i+2}/Y_{i+2} + [(\omega_{i+k}-\omega_{i+2})/(\omega_{i+5}-\omega_{i+2})]*[X_{i+5}/Y_{i+5}-X_{i+2}/Y_{i+2}]$$

$$K4_{k+i} = (k3_{k+i}-K2_{k+i})/(K1_{k+i}-K3_{k+i})$$

Figure 2:
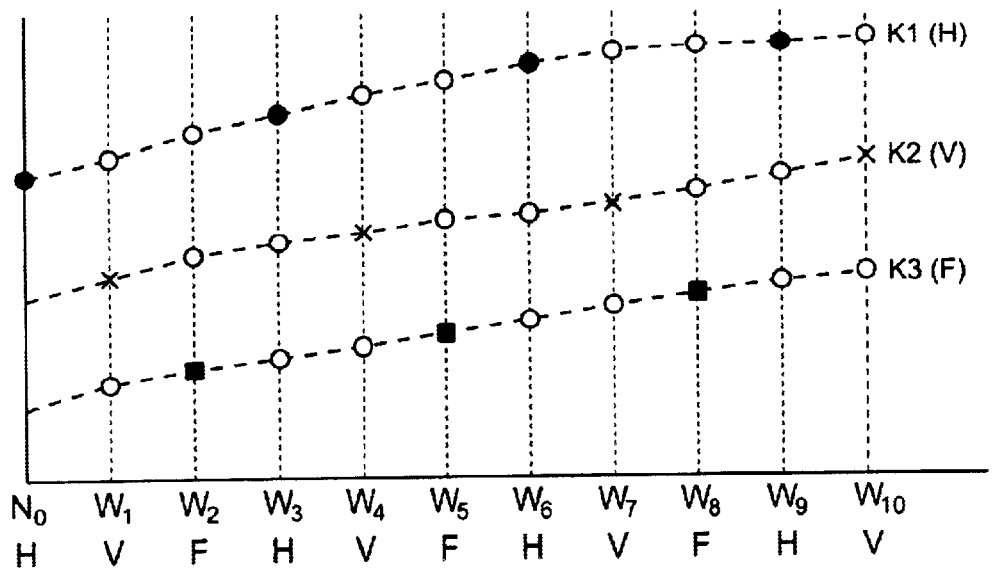
FIG. 2 is a graphical view illustrating the interpolation of wavelength dependent Jones matrix parameters for an optical device according to the present invention.

The calculation begins with i=0 and k=0, 1, 2. For three input states of polarization k=0 is equivalent to the Jones matrix component at the measured Jones vector for the $i^{th}$ optical frequency at the particular input state of polarization and k=1 and 2 provide the interpolated Jones matrix components for the same particular input state of polarization at the $i^{th}+1$ and $i^{th}+2$ optical frequencies. In other words as shown in FIG. 2 $K1_0$ provides the Jones matrix component for the $0^{th}$ optical frequency ($\omega_0$) at the linear-horizontal polarization (H) based on the measured Jones vector $J_0$, and then $K1_1$ and $K1_2$ at the first and second optical frequencies ($\omega_1$ and $\omega_2$) are derived by interpolating between the measured Jones vectors for the $0^{th}$ and $3^{rd}$ ($\omega_3$) optical frequencies, $J_3-J_0$. Then i indexes by three and the calculation repeats with k=0, 1, 2. Once again i indexes by 3 and k=0, 1, 2. This process continues until all the measured Jones vectors for the H polarization have been used. The process is simultaneously performed for the other input states of polarization, V and F, to obtain the values of K2 and K3. The result is a value for K1, K2 and K3 for each optical frequency, one value of which is based on a measured Jones vector and the other two of which are interpolated from measured Jones vectors. The wavelength-dependent Jones matrix at the $i^{th}$ optical frequency is:

$$J_i = \begin{bmatrix} K1_i * K4_i & K2_i \\ K4_i & 1 \end{bmatrix}$$

This equation represents the desired Jones matrix for the device under test at each optical frequency over the wavelength range from which the PDL and DGD equations may be used to determine the respective wavelength-dependent optical characteristics simultaneously.

Thus the determination of the wavelength-dependent Jones matrix is done using a single scan over a range of wavelengths with a total of N measured output states of polarization, resulting in a three-fold increase in speed over the prior art.

As indicated above the components of the Jones matrix between like states of polarization at the input, i.e., every third optical frequency in this example, may be interpolated over intervening optical frequencies so that the multiple optical characteristics are calculated for each optical frequency within the swept wavelength range. There are many alternate methods of interpolation. One such alternate method is to fit a curve to the real and imaginary components of the x and y states of polarization in the Jones vectors for the same input states of polarization listed in Table 1, and from this fitted curve template the values of the Jones vectors at intervening optical frequencies may be determined for such state of polarization. For example the output Jones vectors for horizontally polarized light H are measured at optical frequencies $\omega_0$, $\omega_3$, $\omega_6$, etc. By plotting the components of the output Jones vector at these frequencies, and applying a curvilinear fit, the values of the components of the Jones vectors for horizontally polarized light at $\omega_1$, $\omega_2$, $\omega_4$, etc. are determined. A similar procedure may be used for each input state of polarization. Through this procedure the output state of polarization at any optical frequency for the three input states of polarization are determined, and from these the Jones matrix may be calculated at each optical frequency, as indicated above. Then DGD and PDL are determined, also as indicated above. The interpolation may be a linear interpolation of ratios as in the equations for $K1_{k+i}$, $K2_{k+i}$ and $K3_{k+i}$ above, a curvilinear interpolation of these ratios, a curvilinear interpolation of the components of the Jones vectors, etc.

Figure 1:
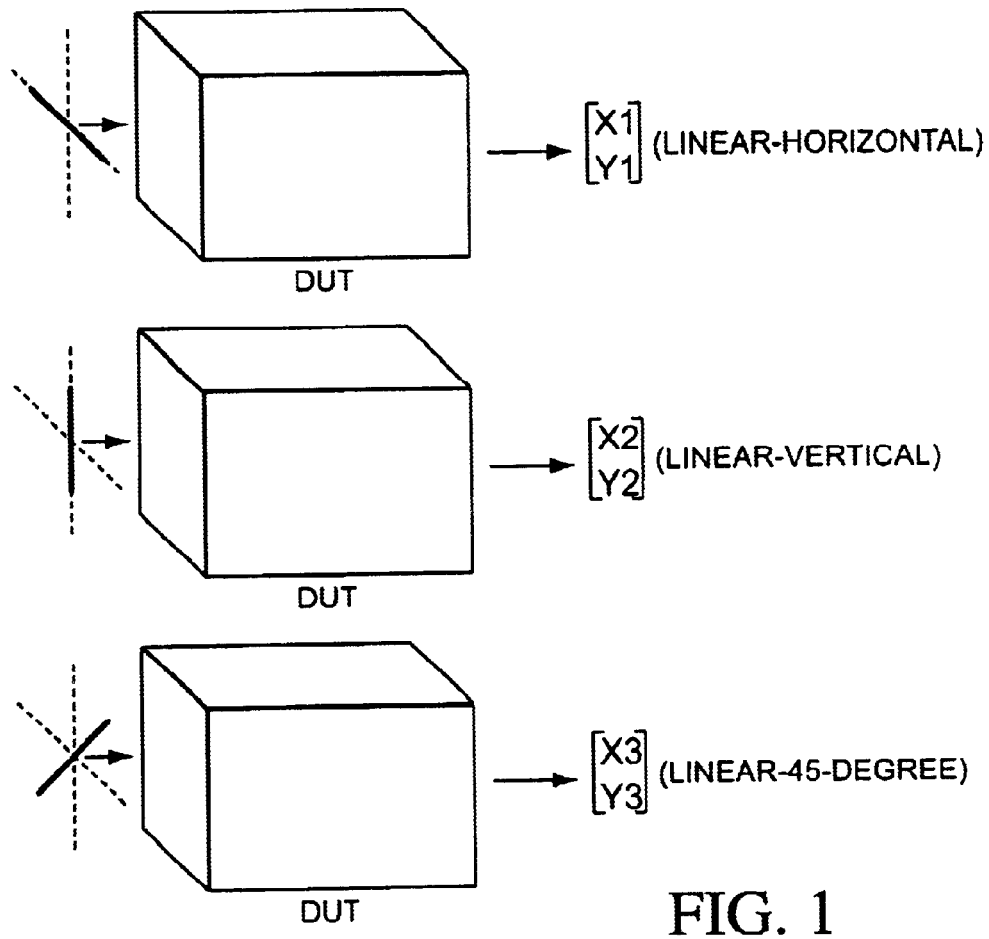
FIG. 1 is a graphical view illustrating a common convention for measuring a Jones matrix for an optical device under test as known in the prior art.
Figure 3:
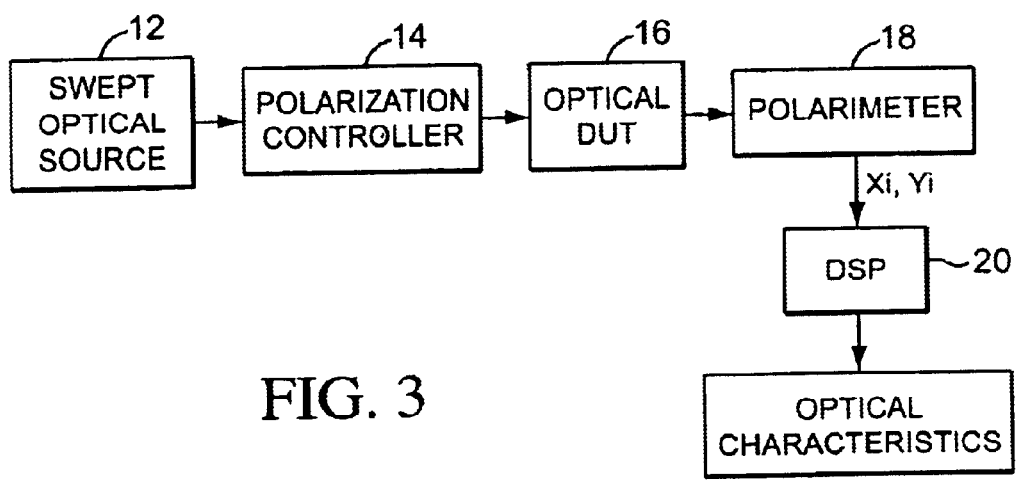
FIG. 3 is a block diagram view of a system for measuring different optical characteristics of an optical device over a single sweep of optical frequencies over a range of wavelengths according to the present invention.

A typical test system is shown in FIG. 3 where a swept optical source 12 provides an optical signal which increments or scans in optical frequency over a designated wavelength range. The optical signal is input to a polarization controller 14 that changes the state of polarization of the optical signal cyclically for each incremental change in optical frequency among defined states of polarization, such as linear-horizontal, linear-vertical and +linear-45-degree states of polarization as shown in Table 1 above. The resulting polarized optical signal is then input to the optical device under test (DUT) 16. The optical signal output from the DUT 14 is input to a polarimeter 18. The measured outputs from the polarimeter 18 are input to a processor 20, such as a digital signal processor (DSP), where the Jones matrix for each optical frequency of the optical signal over the wavelength range is calculated as indicated above. The DSP 20 then provides as outputs the wavelength-dependent optical characteristics of the DUT 16, such as PDL and DGD, determined from the Jones matrices. Although three specific linear states of polarization are referenced here, any three distinct states of polarization may be used from which the Jones vectors may be measured.

Thus the present invention provides a method of performing a single sweep simultaneous measurement of multiple optical characteristics of an optical device using a swept wavelength optical system by cyclically changing the input states of polarization of an optical signal on consecutive optical frequency increments of the wavelength scan and measuring the output state of polarization from the optical device, from which measurements a wavelength dependent Jones matrix is calculated, the wavelength dependent Jones matrix then being used to determine the multiple optical characteristics of the optical device simultaneously.

What is claimed is:

1. A method of measuring multiple optical characteristics of an optical device comprising the steps of:

applying a swept-wavelength optical signal to an input of the optical device, the swept-wavelength optical signal having a state of polarization that changes for each change in optical frequency over a range of wavelengths of the swept-wavelength optical signal, the state of polarization varying cyclically among a plurality of defined states of polarization;

measuring a state of polarization at an output of the optical device to generate a Jones vector for each change in optical frequency; and calculating the multiple optical characteristics from the Jones vectors generated from a single sweep of the swept-wavelength optical signal over the range of wavelengths.

2. The method as recited in claim 1 wherein the calculating step comprises the step of interpolating from the Jones vectors generated from the measured states of polarization Jones vectors for each of the defined states of polarization at each change of the optical frequency.

3. The method as recited in claim 2 wherein the calculating step further comprises the step of generating from the generated and interpolated Jones vectors a wavelength-dependent Jones matrix for the optical device.

4. The method as recited in claim 3 wherein the calculating step further comprises the step of calculating from the wavelength-dependent Jones matrix the multiple optical characteristics.

5. The method as recited in any of claims 1–4 wherein the multiple optical characteristics comprise polarization differential group delay and polarization-dependent loss.

6. The method as recited in claim 5 wherein the defined states of polarization comprise three defined states of polarization.

7. The method as recited in claim 6 wherein the three defined states of polarization comprise a linear-horizontal state of polarization, a linear-vertical state of polarization and a linear-forty-five degree state of polarization.

8. A system for determining multiple optical characteristics of an optical device comprising:

an optical source that outputs a swept-wavelength optical signal;

means for cyclically changing an input state of polarization of the swept-wavelength optical signal for each change to produce an input optical signal for application to the optical device, the input state of polarization cycling between a plurality of defined states of polarization;

means for measuring an output state of polarization from an optical signal output by the optical device in response to the input optical signal at each change of optical frequency; and means for calculating the multiple optical characteristics from the output states of polarization measured over a single sweep of the swept-wavelength optical signal.

9. The system as recited in claim 8 wherein the calculating means comprises:

means for generating from the output states of polarization corresponding measured Jones vectors for each change in optical frequency;

means for calculating from the measured Jones vectors a wavelength-dependent Jones matrix for the optical device; and means for calculating from the Jones matrix the multiple optical characteristics.

10. The system as recited in claim 9 wherein the wavelength-dependent Jones matrix calculating means comprises:

means for interpolating Jones vectors between the measured Jones vectors for each of the defined states of polarization; and means for calculating a Jones matrix for each change in optical frequency from the measured and interpolated Jones vectors to produce the wavelength-dependent Jones matrix.

11. The system as recited in any of claims 8–10 wherein the multiple optical characteristics comprise polarization-dependent loss and polarization differential group delay.

12. The system as recited in claim 11 wherein the defined states of polarization comprise three defined states of polarization.

13. The system as recited in claim 12 wherein the three defined states of polarization comprise a linear-horizontal state of polarization, a linear-vertical state of polarization and a linear-forty-five degree state of polarization.

* * * * *